United States Patent
Hayama et al.

(10) Patent No.: US 8,761,936 B2
(45) Date of Patent: Jun. 24, 2014

(54) TEACHING LINE CORRECTING APPARATUS, TEACHING LINE CORRECTING METHOD, AND PROGRAM THEREOF

(75) Inventors: Hironobu Hayama, Utsunomiya (JP); Shinya Murakami, Utsunomiya (JP); Yutaka Hariya, Utsunomiya (JP); Naoki Eto, Utsunomiya (JP); Masashi Takebe, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 812 days.

(21) Appl. No.: 12/941,198

(22) Filed: Nov. 8, 2010

(65) Prior Publication Data

US 2011/0118876 A1 May 19, 2011

(30) Foreign Application Priority Data

Nov. 18, 2009 (JP) .................. 2009-262706

(51) Int. Cl.
*B25J 9/10* (2006.01)
*G05B 19/04* (2006.01)
*G05B 19/42* (2006.01)
*G05B 19/404* (2006.01)

(52) U.S. Cl.
USPC ........... 700/254; 700/252; 700/253; 700/259; 901/9; 901/42; 901/43

(58) Field of Classification Search
USPC ................ 318/568.13–568.14; 700/245–264; 901/3–5, 41–43, 9
See application file for complete search history.

(56) References Cited

U.S. PATENT DOCUMENTS

| 3,670,153 | A | * | 6/1972 | Rempert et al. | 250/200 |
| 4,639,878 | A | * | 1/1987 | Day et al. | 700/259 |
| 4,835,710 | A | * | 5/1989 | Schnelle et al. | 700/262 |
| 5,053,976 | A | * | 10/1991 | Nose et al. | 700/251 |
| RE40,212 | E | * | 4/2008 | Watanabe et al. | 700/262 |
| 2006/0030970 | A1 | * | 2/2006 | Watanabe et al. | 700/248 |
| 2007/0075048 | A1 | * | 4/2007 | Kunisaki et al. | 219/91.1 |
| 2007/0213873 | A1 | * | 9/2007 | Ban et al. | 700/245 |
| 2007/0299557 | A1 | * | 12/2007 | Watanabe et al. | 700/250 |
| 2010/0217416 | A1 | * | 8/2010 | Murabata | 700/98 |

FOREIGN PATENT DOCUMENTS

| JP | 1-173107 A | 7/1989 |
| JP | 1-188903 A | 7/1989 |
| JP | 2004-243215 A | 9/2004 |
| JP | 2007-115011 A | 5/2007 |

* cited by examiner

*Primary Examiner* — Khoi Tran
*Assistant Examiner* — Dale Moyer
(74) *Attorney, Agent, or Firm* — Arent Fox LLP (57) ABSTRACT

A teaching line correcting apparatus defines a first plane, which is determined by a first reference position of a preset first reference region, a second reference position of a preset second reference region, and a third reference position of a preset third reference region, defines a second plane, which is determined by a detected position of the first reference region, a detected position of the second reference region, and a detected position of the third reference region, calculates a corrective value for equalizing the first reference region to an origin, equalizing the first reference position of the first reference region as the origin to the detected position of the first reference region as the origin, and equalizing the first plane to the second plane, and correcting reference coordinates where operating points are taught based on the calculated corrective value.

10 Claims, 6 Drawing Sheets

TEACHING LINE CORRECTING APPARATUS, TEACHING LINE CORRECTING METHOD, AND PROGRAM THEREOF

CROSS-REFERENCE TO RELATED APPLICATION

This application is based upon and claims the benefit of priority from Japanese Patent Application No. 2009-262706 filed on Nov. 18, 2009, of which the contents are incorporated herein by reference.

BACKGROUND OF THE INVENTION

1. Field of the Invention

The present invention relates to a teaching line correcting apparatus, a teaching line correcting method, and a program thereof. More particularly, the present invention concerns a teaching line correcting apparatus, a teaching line correcting method, and a program for correcting with high accuracy a teaching line for an industrial robot that works on a workpiece, such as for applying a sealer to the workpiece, welding the workpiece, etc.

2. Description of the Related Art

In the art of industrial robot teaching, there has been proposed a technology for measuring and acquiring three-dimensional coordinate data, which are representative of positions of operating points of an industrial robot on a workpiece that is worked on, recognizing the position and attitude of the workpiece, determining a rigid body transformation matrix from a workpiece model, converting three-dimensional coordinate data of the workpiece model into measured three-dimensional coordinate data according to the rigid body transformation matrix, and registering the converted three-dimensional coordinate data. The proposed technology is illustrated in Japanese Laid-Open Patent Publication No. 2004-243215.

According to the technology disclosed in Japanese Laid-Open Patent Publication No. 2004-243215, in order to generate teaching data, a rigid body transformation matrix is determined so as to transform points Q on three-dimensional shape data of a workpiece model (design) into corresponding points P on three-dimensional shape data of a measured workpiece. If the positions of the corresponding points P are different from predetermined positions for various reasons such as machine errors, then the correlation of the points P from the origin 0 tends to suffer from errors, and such teaching data cannot be corrected accurately. Further, if any one of the positions of the points P (reference regions) cannot be detected, then the teaching data cannot be corrected.

SUMMARY OF THE INVENTION

It is an object of the present invention to provide a teaching line correcting apparatus, a teaching line correcting method, and a program for correcting teaching data (teaching lines) accurately while reducing errors that occur when the correlation of reference regions is different, and also for correcting teaching data even if one of the positions of the reference regions cannot be detected.

To achieve the above object, there is provided in accordance with the present invention a teaching line correcting apparatus for correcting a teaching line, which is identified by a first reference region and a second reference region, and which is indicative of movement of a robot, comprising a position setting unit for setting a first reference position, a second reference position, and a third reference position where a first reference region, a second reference region, and a third reference region are established on a workpiece, a first plane defining unit for defining a first plane, which includes a line passing through the first reference position that is located at a starting operation point of the robot or within a given range from the starting operation point, and the second reference position, which is located at an ending operation point of the robot or within a given range from the ending operation point, and which is determined by the third reference position, at least one position detector for detecting positions of the first reference region, the second reference region, and the third reference region established on the workpiece, a second plane defining unit for defining a second plane, which includes a line passing through the detected position of the first reference region and the detected position of the second reference region, and which is determined by the detected position of the third reference region, a corrective value calculator for calculating a corrective value for equalizing the first reference region to an origin, equalizing the first reference position of the first reference region as the origin to the detected position of the first reference region as the origin, and equalizing the first plane to the second plane, and a teaching line corrector for correcting the teaching line based on the calculated corrective value.

If the position detector fails to detect any one of the first reference region, the second reference region, or the third reference region, the second plane defining unit may define, as the second plane, a plane that includes a line passing through a position closest to the first reference region and a position closest to the second reference region, out of the detected positions of the remaining two reference regions, and which is determined by an undetected position of the reference region that has been set by the position setting unit. The corrective value calculator may calculate a corrective value for equalizing the reference region closest to the first reference region to the origin, equalizing the reference position of the reference region as the origin to the detected position of the reference region as the origin, and equalizing the first plane to the second plane.

The workpiece may comprise an automobile body made up of a plurality of panels, and the position setting unit may set two of the first reference position, the second reference position, and the third reference position on one of the panels.

The second reference position set by the position setting unit may be located at an end of the workpiece.

At least one of the position detector, the corrective value calculator, and the teaching line corrector may be included in the robot.

The position detector may comprise a photoelectric transducer.

To achieve the aforementioned object, there also is provided in accordance with the present invention a teaching line correcting method for correcting a teaching line, which is identified by a first reference region and a second reference region, and which is indicative of movement of a robot, comprising the steps of presetting a first reference position, a second reference position, and a third reference position where a first reference region, a second reference region, and a third reference region are established on a workpiece, defining a first plane, which includes a line passing through the first reference position that is located at a starting operation point of the robot or within a given range from the starting operation point and the second reference position that is located at an ending operation point of the robot or within a given range from the ending operation point, and which is determined by the third reference position, detecting positions of the first reference region, the second reference region, and the third reference region established on the workpiece, defining a second plane, which includes a line passing through the detected position of the first reference region and the detected position of the second reference region, and which is determined by the detected position of the third reference region, calculating a corrective value for equalizing the first reference region to an origin, equalizing the first reference position of the first reference region as the origin to the detected position of the first reference region as the origin, and equalizing the first plane to the second plane, and correcting the teaching line based on the calculated corrective value.

To achieve the above object, there is further provided in accordance with the present invention a program for enabling a computer to function as a teaching line correcting apparatus for correcting a teaching line, which is identified by a first reference region and a second reference region, and which is indicative of movement of a robot, the program further enabling the computer to function as a position setting unit for presetting a first reference position, a second reference position, and a third reference position where a first reference region, a second reference region, and a third reference region are established on a workpiece, a first plane defining unit for defining a first plane, which includes a line passing through the first reference position that is located at a starting operation point of the robot or within a given range from the starting operation point and the second reference position that is located at an ending operation point of the robot or within a given range from the ending operation point, and which is determined by the third reference position, at least one position detector for detecting positions of the first reference region, the second reference region, and the third reference region established on the workpiece, a second plane defining unit for defining a second plane, which includes a line passing through the detected position of the first reference region and the detected position of the second reference region, and which is determined by the detected position of the third reference region, a corrective value calculator for calculating a corrective value for equalizing the first reference region to an origin, equalizing the first reference position of the first reference region as the origin to the detected position of the first reference region as the origin, and equalizing the first plane to the second plane, and a teaching line corrector for correcting the teaching line based on the calculated corrective value.

According to the present invention, the first plane and the second plane include lines passing through the starting operation points of the robot or the positions of the first reference regions within given ranges from the starting operation points, and the ending operation points of the robot or the positions of the second reference regions within given ranges from the ending operation points, and which are determined by the detected positions of the third reference regions. A corrective value is calculated for equalizing the reference position (a) of the first reference region as the origin to the detected position (a') of the second reference region as the origin, and for equalizing the first plane to the second plane. Reference coordinates where operating points are taught are corrected according to the calculated corrective value. Therefore, even if the correlation of the reference regions on the workpiece is different due to error, the effect that the error has on the correction of the teaching line can be reduced. The correction accuracy and the stability of the correction accuracy thus are increased.

If the position of any one of the first reference region, the second reference region, or the third reference region cannot be detected, then since the corrective value is calculated from the first plane and the second plane by moving the origin to the reference region, which is closest to the first reference region, and using the undetected reference region to determine an angle of the second plane, the teaching line can be corrected even though the position of any one of the first reference region, the second reference region, and the third reference region is not detected. Since the teaching line, after being corrected, can absorb the distance that the workpiece has moved on the first plane, the robot can apply the sealer more accurately than if the teaching line were not corrected.

If the workpiece comprises an automobile body made up of a plurality of panels, then the position setting unit sets two of the first reference position, the second reference position, and the third reference position on one of the panels, while setting the remaining reference position on another one of the panels. In this manner, when a teaching line, which is set on a desired one of the panels, is corrected, the effect that the accuracy with which the panels are assembled together has on the correction of the teaching line is reduced.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A teaching line correcting apparatus according to a preferred embodiment of the present invention will be described in detail below with reference to the accompanying drawings.

Figure 1:
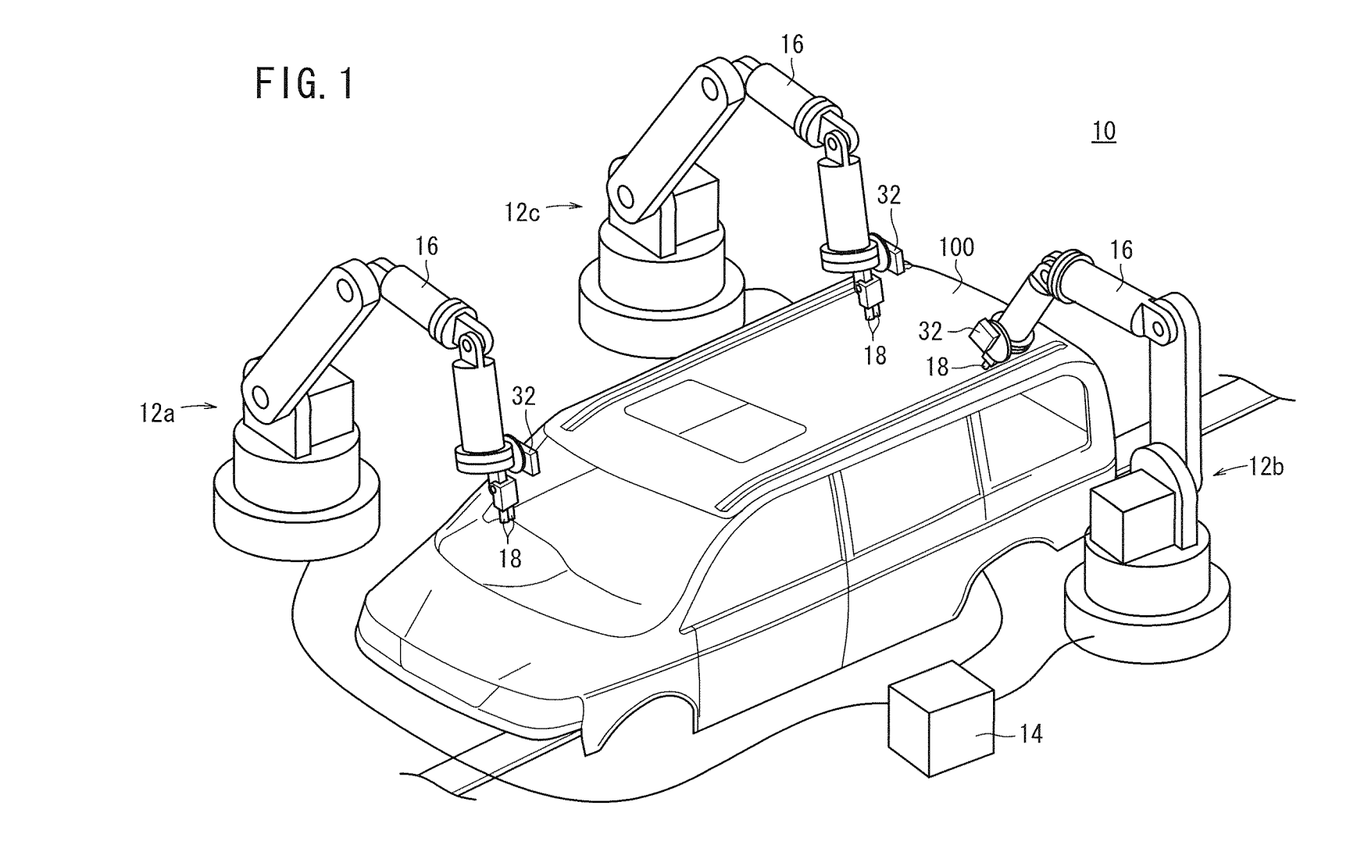
FIG. 1 is a perspective view of a teaching line correcting apparatus according to an embodiment of the present invention.

FIG. 1 is a perspective view of a teaching line correcting apparatus 10 according to an embodiment of the present invention. As shown in FIG. 1, the teaching line correcting apparatus 10 comprises at least three robots 12a, 12b, 12c, and a controller 14 for controlling the robots 12a, 12b, 12c. Each of the robots 12a, 12b, 12c includes an articulated arm 16 having multiple degrees of freedom for three-dimensional movement in any of desired directions. Two sealer guns 18 are carried on a distal end of the articulated arm 16 for applying a sealer to a workpiece 100 such as an automobile body, for example. A position detector 32 also is carried thereon for detecting the spatial positions of reference regions on the workpiece 100. The sealer guns 18 are used selectively depending on the type of sealer to be applied to the workpiece 100. The articulated arm 16 may carry a required number of sealer guns on the distal end thereof. The robots 12a, 12b, 12c are disposed around the workpiece 100, sharing the sealer applying process among them, to apply the sealer to the workpiece 100 by operating along respective teaching lines, which are different from each other. The sealer applied to the workpiece 100 along each of the teaching lines covers a starting operation point (sealer application start point) of the robot and an ending operation point (sealer application end point) of the robot.

The robots 12a, 12b, 12c have predetermined operating points with respect to the workpiece 100. The operating points are determined in advance with respect to the workpiece 100 when the workpiece 100 is located in a prescribed position and oriented in a prescribed direction. Actually, the workpiece 100, which is delivered to the prescribed position by a belt conveyor or the like, may be oriented in a direction that is displaced slightly from the prescribed direction. If the workpiece 100 is oriented in a direction that is slightly displaced from the prescribed direction, then when the robots 12a, 12b, 12c apply the sealer to the workpiece 100 at the predetermined operating points, the sealer is applied to areas of the workpiece 100, which are different from target areas of the workpiece 100 that actually are to be coated with the sealer. To solve this problem, the operating points of the robots 12a, 12b, 12c need to be corrected. However, the burden imposed by the correcting process, and the number of man-hours required by the correcting process are increased if the robots 12a, 12b, 12c include many operating points. According to the present embodiment, the operating points per se are not corrected, but rather, reference coordinates where the operating points are taught are corrected using iRVision (registered trademark) manufactured by Fanuc Ltd., to thereby reduce the burden imposed by the correcting process, as well as the number of man-hours required by the correcting process.

The teaching lines for the respective robots 12a, 12b, 12c are determined by reference regions, such as holes or the like on the workpiece 100. More specifically, a teaching line is determined by a first reference region, which is located at the starting operation point on the workpiece 100 or within a given range from the starting operation point, and a second reference region, which is located at the ending operation point on the workpiece 100 or within a given range from the ending operation point. If a teaching line is determined as a line interconnecting a first reference region, which is located within a given range from the starting operation point, and a second reference region, which is located within a given range from the ending operation point, then the position a' of the first reference region and the position b' of the second reference region are determined such that the starting operation point and the ending operation point are on the teaching points, and such that the starting operation point and the ending operation point are positioned between the first reference region and the second reference region. The fact that the starting operation point and the ending operation point are on the teaching points implies that when the sealer is applied to the workpiece 100 along the teaching line, the operation points are covered by the applied sealer. The reference regions, which include the first reference region and the second reference region, occupy respective predetermined positions on the workpiece 100.

In a process for establishing reference regions on the workpiece 100, for various reasons such as positional or directional displacement of the workpiece 100, or due to machining errors for establishing reference regions on the workpiece 100, the positions of the reference regions actually established on the workpiece 100 tend to differ slightly from the positions of predetermined reference regions on the workpiece 100, thus causing the correlation between such reference regions to be shifted. Even if the workpiece 100, which is delivered to the prescribed position by a belt conveyor or the like, is oriented in the prescribed direction, since the actual reference regions are not properly situated in the predetermined positions, the workpiece 100 is judged as being oriented in a direction that is displaced from the prescribed direction, and the teaching lines are corrected even though they do not need to be corrected. Accordingly, the correction procedure for the teaching lines is poor in accuracy. On the other hand, if the workpiece 100, which has been delivered to the prescribed position, is oriented in a direction that differs from the prescribed direction and the reference regions occupy positions that are different from the predetermined positions, then the correction procedure for the teaching lines is unstable in terms of accuracy, because the procedure is adversely affected by the direction in which the workpiece 100 is oriented, as well as by the positions of the reference regions. According to the present embodiment, even if the correlation of the reference regions on the workpiece 100 differs from a predetermined correlation, the teaching lines can be corrected in order to reduce the effect that such an error has on correction of the teaching lines.

Figure 2:
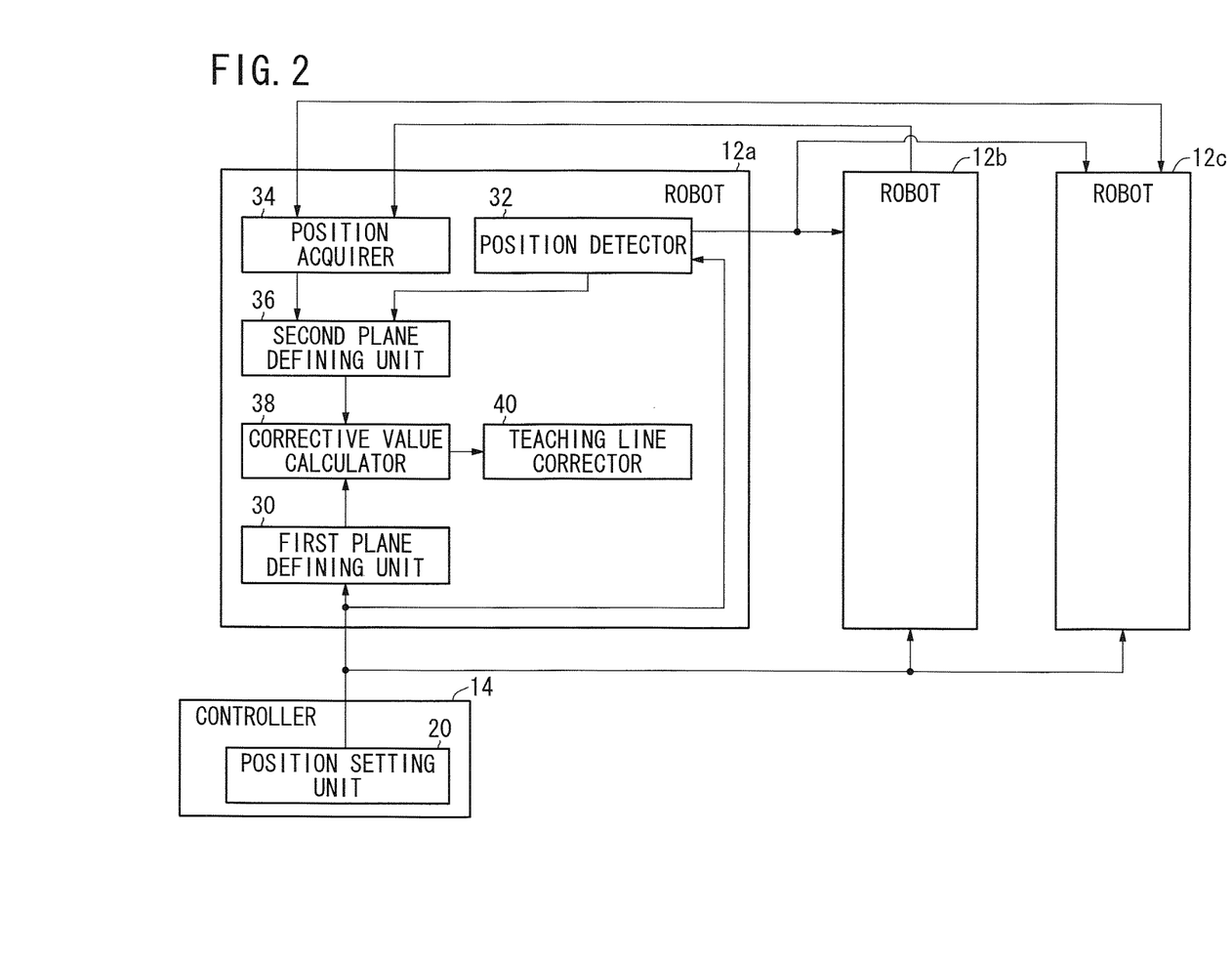
FIG. 2 is a block diagram of an electrical system of the teaching line correcting apparatus shown in FIG. 1.

FIG. 2 is a block diagram of an electrical system of the teaching line correcting apparatus 10 shown in FIG. 1. The robots 12a, 12b, 12c are identical in structure to each other, and will be collectively referred to as a robot 12 when necessary. As described above, the teaching line correcting apparatus 10 includes the robots 12a, 12b, 12c and the controller 14. The controller 14 comprises a position setting unit 20 as a functional section thereof. The controller 14 includes, as hardware components, a CPU, a memory storing a program and data, an operation unit operable by a user, and an input/output interface for exchanging data with an external device. The controller 14 functions as the position setting unit 20 when the CPU reads a program from memory and runs the program. Any one, or each one, of the robots 12a, 12b, 12c may incorporate the controller 14 therein.

The robot 12a comprises a first plane defining unit 30, a position detector 32, a position acquirer 34, a second plane defining unit 36, a corrective value calculator 38, and a teaching line corrector 40, serving as functional sections thereof. The robot 12a includes, as hardware components thereof, a CPU, and a memory that stores a program and data. When the CPU reads the program from memory and runs the program, the robot 12a functions as the first plane defining unit 30, the position detector 32, the position acquirer 34, the second plane defining unit 36, the corrective value calculator 38, and the teaching line corrector 40.

The position setting unit 20 sets a plurality of reference positions at which a plurality of respective reference regions are established on the workpiece 100. Depending on the type of workpiece 100 delivered to the prescribed position, the position setting unit 20 sets a plurality of reference positions for each of corresponding reference regions. A teaching line for each of the robots 12a, 12b, 12c is determined based on two of the reference positions, which have been set by the position setting unit 20. The position setting unit 20 may acquire reference positions from an external device and set the acquired reference positions, or may acquire values that are entered from the operation unit operated by a user, and set the acquired values as reference positions. The robots 12a, 12b, 12c have different teaching lines, respectively. The position setting unit 20 outputs the set reference positions to the robots 12a, 12b, 12c.

The first plane defining unit 30 acquires three reference positions from among the reference positions set by the position setting unit 20, i.e., a first reference position a and a second reference position b, which determine a teaching line indicative of movement of the robot 12 that includes the first plane defining unit 30, i.e., movement of the sealer guns 18 of the robot 12 that includes the first plane defining unit 30, and an arbitrary third reference position c. The first plane defining unit 30 defines a first plane, which includes a line that passes through the acquired first reference position a and the acquired second reference position b, and which is determined by the arbitrary third reference position c. According to the present embodiment, the reference positions that determine the teaching line, which is indicative of movement of the robot 12 itself, are referred to as a first reference position a and a second reference position b, respectively, and the reference position that does not determine the teaching line indicative of movement of the robot 12 itself is referred to as a third reference position c. A reference position, which serves as the first reference position a for a given robot 12, may also serve as the third reference position c for another robot 12, for example. The reference region at the first reference position a, the reference region at the second reference position b, and the reference region at the third reference position c are referred to as a first reference region, a second reference region, and a third reference region, respectively.

The position detector 32 detects three-dimensional positions of reference regions on the workpiece 100 that are located within an area covered by the robot 12, which itself has the position detector 32. The position detector 32 detects at least the position of the first reference region, which determines the teaching line indicative of movement of the robot 12 itself. The robot 12 may move the arm 16 of its own position detector 32 in order to easily detect the positions of reference regions on the workpiece 100, which are located within the area covered by the robot 12.

The positioning process carried out by the position detector 32 is known, and therefore will be described only briefly below. For example, the position detector 32 has a photoelectric transducer such as a CCD, and a laser slit emitter such as an iRVision camera (registered trademark) manufactured by Fanuc Ltd., for example. The position detector 32 captures an image (laser beam image) produced when a laser beam is emitted, and an image (normal image) produced when the laser beam is not emitted, and then detects three-dimensional positions of the reference regions from the photoelectric transducer. More specifically, the position detector 32 detects three-dimensional positions of reference regions based on the present three-dimensional position of the photoelectric transducer and the detected three-dimensional positions of the reference regions from the photoelectric transducer. Since the photoelectric transducer is mounted on the distal end of the arm 16, the present position of the distal end of the arm 16 is recognized, and the present position of the photoelectric transducer is recognized depending on how the arm 16 is moved. The position detector 32 may be of any design insofar as the position detector 32 is capable of detecting three-dimensional positions of the reference regions.

The position acquirer 34 acquires positions of the reference regions, which are detected by the position detectors 32 of the other robots 12. The position acquirer 34 also acquires positions a', b' of the first and second reference regions, which determine the teaching line that is indicative of movement of at least the robot 12 itself, as well as the position c' of the arbitrary third reference region.

The second plane defining unit 36 acquires the positions a', b' of the first and second reference regions, which determine the teaching line indicative of movement of the robot 12 itself, and the position c' of the arbitrary third reference region. The positions a', b', c' are detected by the position detector 32 of the robot 12 itself and the position detectors 32 of the other robots 12. The second plane defining unit 36 then defines a second plane, which includes a line that passes through the position a' of the first reference region and the position b' of the second reference region, and which is determined by the position c' of the arbitrary third reference region. The third reference region in the second plane defining unit 36 is identical to the third reference region in the first plane defining unit 30.

The corrective value calculator 38 acquires the first plane and the second plane, which are defined respectively by the first plane defining unit 30 and the second plane defining unit 36 of the robot 12 itself. The corrective value calculator 38 then calculates a corrective value for equalizing the first reference region to an origin, for equalizing the first reference position a of the first reference region as the origin to the detected position a' of the first reference region as the origin, and for equalizing the first plane to the second plane. The method of calculation of the corrective value is known in the art. For example, the corrective value can be calculated using VISION OPTION manufactured by Fanuc Ltd., for example.

The teaching line corrector 40 corrects the teaching line, which is determined by the first reference position a and the second reference position b, based on the corrective value calculated by the corrective value calculator 38 of the robot 12 itself.

An operation sequence of the teaching line correcting apparatus 10 will be described below with reference to the flowchart shown in FIG. 3. For the sake of brevity, only the process of correcting the teaching line, which is indicative of movement of the robot 12a, will be described.

Figure 3:
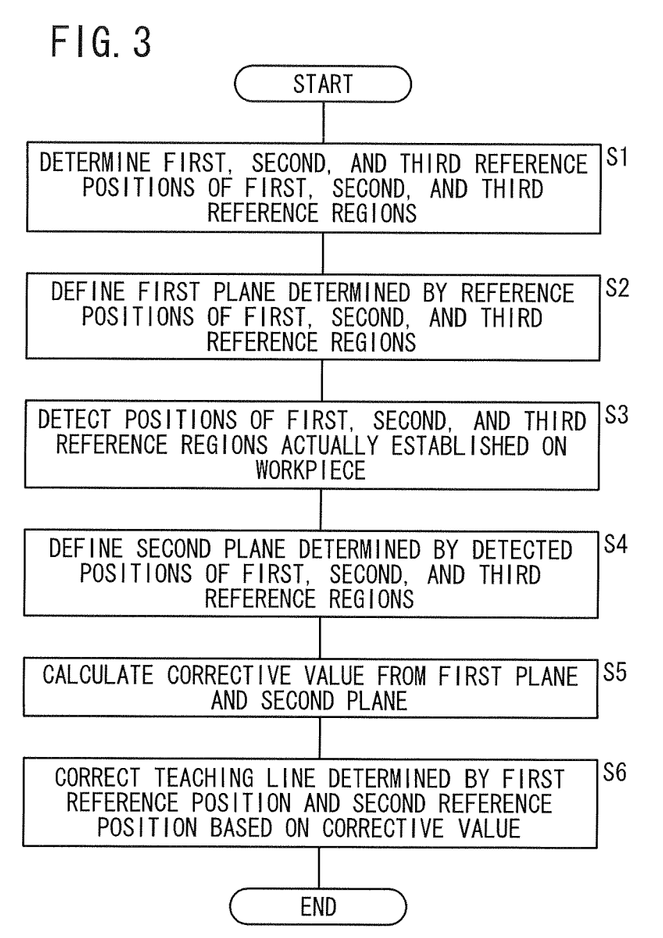
FIG. 3 is a flowchart of an operation sequence of the teaching line correcting apparatus.

In step S1 shown in FIG. 3, the position setting unit 20 sets a first reference position a, a second reference position b, and a third reference position c, at which a first reference region and a second reference region for determining a teaching line indicative of movement of the robot 12a, and an arbitrary third reference region are established on the workpiece 100. The position setting unit 20 sets the first reference position a, the second reference position b, and the third reference position c depending on the type of workpiece 100 that has been delivered to the prescribed position by a belt conveyor or the like.

In accordance with the first reference position a, the second reference position b, and the third reference position c, which have thus been set by the position setting unit 20, the first reference region, the second reference region, and the third reference region are established on the workpiece 100. The position a' of an actual first reference region, the position b' of an actual second reference region, and the position c' of an actual third reference region may possibly differ slightly from the first reference position a, the second reference position b, and the third reference position c, which have been set by the position setting unit 20.

In step S2, the first plane defining unit 30 of the robot 12a defines a first plane, which includes a line that passes through the first reference position a and the second reference position b, which have been set in step S1, and which is determined by the third reference position c. Stated otherwise, when a plane that includes a line passing through the first reference position a and the second reference position b is rotated about the line that passes through the first reference position a and the second reference position b, and then is held at an angle determined by the third reference position c, such a plane is defined as a first plane.

Then, when the workpiece 100 is delivered to the prescribed position by a belt conveyor or the like, the position detectors 32 of the robots 12a, 12b, 12c detect three-dimensional positions of the first reference region, the second reference region, and the third reference region on the workpiece 100, which has been delivered to the prescribed position. In the present embodiment, the position detector 32 of the robot 12a detects the position a' of the first reference region that is located in the area covered by the robot 12a, the position detector 32 of the robot 12b detects the position b' of the second reference region that is located in the area covered by the robot 12b, and the position detector 32 of the robot 12c detects the position c' of the third reference region that is located in the area covered by the robot 12c. Depending on the first reference position a, the second reference position b, and the third reference position c, which are set by the position setting unit 20, the robots 12a, 12b, 12c are capable of moving the respective arms 16 for the position detectors 32 in order to easily detect the positions of the reference regions on the workpiece 100, which are located respectively in the areas covered by the robots 12a, 12b and 12c. The position detector 32 of the robot 12a outputs the detected position a' of the first reference region to the second plane defining unit 36 of the robot 12a. The position detectors 32 of the robots 12b, 12c respectively output the detected position b' of the second reference region and the detected position c' of the third reference region to the second plane defining unit 36 of the robot 12a. Then, the second plane defining unit 36 of the robot 12a acquires the position b' of the second reference region and the position c' of the third reference region via the position acquirer 34.

Figure 4:
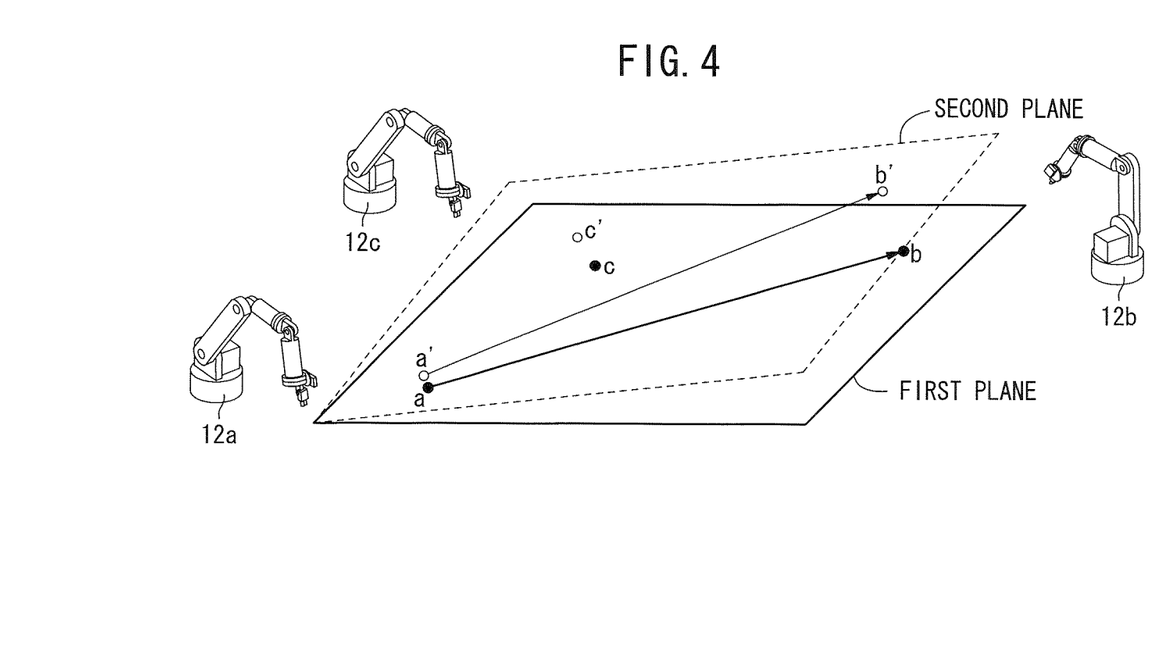
FIG. 4 is a perspective view showing by way of example a defined first plane and a defined second plane.

In step S4, the second plane defining unit 36 of the robot 12a defines a second plane, which includes a line passing through the detected position a' of the first reference region and the detected position b' of the second reference region, and which is determined by the detected position c' of the third reference region. Stated otherwise, when a plane that includes a line passing through the position a' of the first reference region and the position b' of the second reference region is rotated about the line that passes through the position a' of the first reference region and the position b' of the second reference region, and then is held at an angle determined by the position c' of the third reference region, such a plane is defined as a second plane. FIG. 4 shows by way of example the first plane and the second plane, which are defined in the foregoing manner.

In step S5, the corrective value calculator 38 of the robot 12a calculates a corrective value for equalizing the first reference region to the origin, for equalizing the first reference position a of the first reference region as the origin to the detected position a' of the first reference region as the origin, and for equalizing the first plane to the second plane.

In step S6, the teaching line corrector 40 of the robot 12a corrects the teaching line, which was determined by the first reference position a and the second reference position b, based on the corrective value calculated in step S5.

As described above, the first plane and the second plane include lines that pass through the starting operation points or the positions (reference positions a, a') within given ranges from the starting operation points and the ending operation points, or the positions (reference positions b, b') within given ranges from the ending operation points, and which are determined by the positions (reference positions c, c') of the third reference regions. Therefore, even if the correlation of the reference regions on the workpiece 100 is shifted from a predetermined correction, the effect that the error has on correction of the teaching line is reduced. The reasons as to why such an effect is reduced shall be described below.

Figure 5:
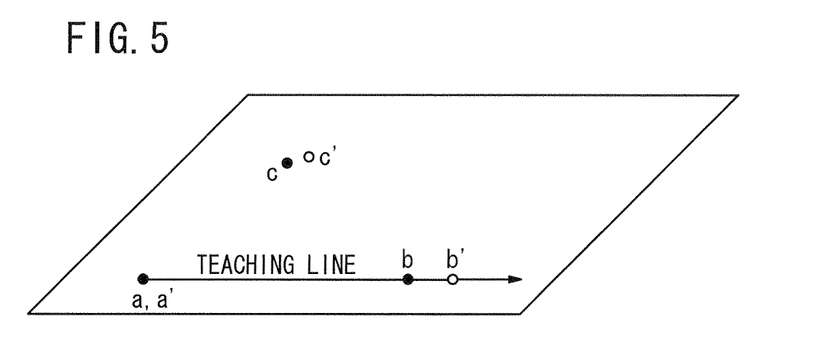
FIG. 5 is a perspective view illustrative of reasons as to why an effect that an error has on the correction of a teaching line is reduced.
Figure 6:
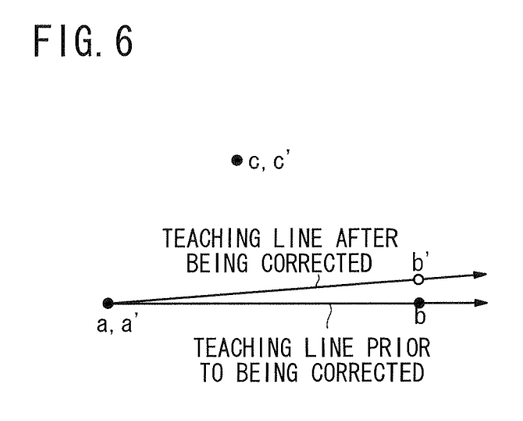
FIG. 6 is a perspective view illustrative of reasons as to why an effect that an error has on the correction of a teaching line is reduced.

FIGS. 5 and 6 are perspective views illustrative of reasons as to why the effect that an error has on correction of a teaching line is reduced. In FIGS. 5 and 6, to facilitate understanding of the present invention, it is assumed that the direction of the workpiece 100, which is delivered to the prescribed position, is not displaced, and that only the reference regions on the workpiece 100 are disposed in positions that are displaced from the predetermined positions. In this case, under normal circumstances, the teaching line does not need to be corrected.

For example, it is assumed that only the detected position b' of the second reference region shown in FIG. 5 is displaced from the second reference position b, and that the detected position b' lies on a line passing through the first reference position a and the second reference position b. The first plane is a plane among a plurality of planes that exist around the line that passes through the first reference position a and the second reference position b, wherein the plane is held at an angle determined by the third reference position c. Even though the detected position b' of the second reference region differs from the second reference position b, since the position b' of the second reference region lies on the line that passes through the first reference position a and the second reference position b, the defined second plane is identical to the first plane. Therefore, the teaching line essentially is uncorrected and remains unchanged. In the event that the correlation of the reference regions is different due to such an error, correction of the teaching line is not affected by such an error.

Even if only the detected position c' of the third reference region shown in FIG. 5 is displaced from the third reference position c, provided that the detected position c' of the third reference region lies on the first plane defined by the first reference position a, the second reference position b, and the third reference position c, the thus defined second plane is identical to the first plane. Therefore, the teaching line essentially is uncorrected and remains unchanged.

In other words, if the position b' of the second reference region lies on the line that passes through the first reference position a and the second reference position b, and the position c' of the third reference region lies on the first plane, then the teaching line essentially is uncorrected and remains unchanged. In the event that the correlation of the reference regions is different due to such an error, the correction of the teaching line is not affected by the error. In this case, it is assumed that the first reference position a and the position a' of the first reference region are not displaced from each other.

As shown in FIG. 6, it is assumed that the position b' of the second reference region is displaced from the second reference position b and does not lie on a line that passes through the first reference position a and the second reference position b. Since the first plane, which is defined by the first reference position a, the second reference position b, and the third reference position c is not identical to the second plane, which is defined by the position a' of the first reference region, the position b' of the second reference region, and the position c' of the third reference region, the teaching line is corrected based on a corrective value determined from the first plane and the second plane. Prior to being corrected, the teaching line passes through the first reference position a and the second reference position b, whereas after being corrected, the teaching line passes through the position a' of the first reference region and the position b' of the second reference region. Since the difference between the teaching line prior to being corrected and the teaching line after being corrected becomes progressively smaller toward the first reference region, the effect that such correction has on the teaching line is reduced in the vicinity of the first reference region. The wider the second reference position b is spaced from the first reference position a beyond the ending operation point (sealer application end point), the smaller the effect is that the correction has on the teaching line. Accordingly, the second reference position b should preferably be located at an end of the workpiece 100.

As described above, the first plane and the second plane include lines that pass through the starting operation points of the robot 12 or the positions (reference positions a, a') of the first reference regions within given ranges from the starting operation points, and the ending operation points of the robot 12 or the positions (reference positions b, b') of the second reference regions within given ranges from the ending operation points, wherein such lines are determined by the detected positions (reference positions c, c') of the third reference regions. A corrective value is calculated for thereby equalizing the reference position a of the first reference region as the origin to the detected position a' of the second reference region as the origin, and for equalizing the first plane to the second plane. Reference coordinates where operating points are taught are corrected according to the calculated corrective value. Therefore, even if the correlation of reference regions on the workpiece 100 differs due to error, the effect of such an error on the correction of the teaching line is reduced. Correction accuracy and the stability of correction accuracy thus are increased.

In FIG. 3, correction of the teaching line, which is indicative of movement of the robot 12a, has been described. Correction of teaching lines, which is indicative of movement of the robots 12b, 12c, can also be carried out in a similar manner. If the workpiece 100 comprises an automobile body made up of a plurality of panels, then the position setting unit 20 may set two of the first reference position a, the second reference position b, and the third reference position c on one of the panels, e.g., the roof, while also setting the remaining one reference position on another one of the panels, e.g., a side panel. In this manner, when a teaching line that is set on a desired one of the panels, e.g., the roof, is corrected, the effect that the accuracy in assembly of the desired panel and the other panel, e.g., the side panel, has on correction of the teaching line is reduced.

In the illustrated embodiment, the position detectors 32 of the robots 12a, 12b, 12c detect respective positions of the first, second, and third reference regions. However, in order for the teaching line correcting apparatus 10 to be able to correct the teaching line, in the event that the position detectors 32 of the robots 12a, 12b, 12c fail to detect any one of the positions of the first reference region, the second reference region, or the third reference region, the second plane defining unit 36 and the corrective value calculator 38 may operate in the following manner.

The second plane defining unit 36 defines, as the second plane, a plane that includes a line passing through a position closest to the first reference region (first reference position a) and a position closest to the second reference region (second reference position b), out of the detected positions of the two remaining reference regions, and which is determined by the undetected position of the reference region that has been set by the position setting unit 20. Stated otherwise, when a plane that includes a line passing through a position closest to the first reference region and a position closest to the second reference region, out of the detected positions of the reference regions, is rotated about the line passing through the position closest to the first reference region and the position closest to the second reference region, and then the plane is held at an angle determined by the undetected position of the reference region, such a plane is defined as the second plane.

The corrective value calculator 38 calculates a corrective value for equalizing the reference region, which is detected by the position detector 32 as being closest to the first reference region, to the origin, thereby equalizing the reference position of the reference region as the origin to the detected position of the reference region as the origin, and for equalizing the first plane to the second plane.

For example, if it is assumed that the position a' of the first reference region is not detected, and the position c' of the third reference region is closest to the first reference position a, then in this case, the second plane defining unit 36 defines a second plane, which includes a line passing through the position c' of the third reference region and the position b' of the second reference region, and which is determined by the undetected position a' of the first reference region that has been set by the position setting unit 20. The corrective value calculator 38 calculates a corrective value for equalizing the third reference region, which is detected by the position detector 32 as being closest to the first reference region, to the origin, thereby equalizing the third reference position c as the origin to the detected position c' of the third reference region as the origin, and equalizing the first plane to the second plane.

Since the corrective value is calculated from the first plane and the second plane by moving the origin to the reference region, which is closest to the first reference region, and by using the undetected reference region to determine an angle of the second plane, the teaching line can be corrected even if the position of any one of the first reference region, the second reference region, and the third reference region is not detected. Since the teaching line, after being corrected, can absorb the distance that the workpiece 100 has moved on the first plane, the robot 12 can apply the sealer more accurately than if the teaching line were not corrected. In other words, even though one reference region cannot be detected, if the axis of a plane is determined by the detected positions of the remaining reference regions, the teaching line can be corrected for displacements in the X direction and the Y direction of the workpiece 100. The X direction refers to the direction of a line that passes through the first reference position a and the second reference position b. The Y direction refers to a direction perpendicular to the line that passes through the first reference position a and the second reference position b.

In the illustrated embodiment, the robots 12a, 12b, 12c include the position detectors 32, respectively. However, only one of the robots 12a, 12b, 12c may include the position detector 32. If only one of the robots 12a, 12b, 12c includes the position detector 32, then the single position detector 32 may detect positions of all of the reference regions. Further, alternatively, a configuration may be provided in which none of the robots 12a, 12b, 12c includes the position detector 32. In this case, a position detector, which is disposed separately from the robots 12a, 12b, 12c, may be provided to detect positions of the reference regions.

In the illustrated embodiment, the robots 12a, 12b, 12c include sealer guns 18 for applying a sealer to the workpiece 100. However, the robots 12a, 12b, 12c may include different end effectors, for welding workpieces, for marking workpieces, or for otherwise performing processing on workpieces.

Although a certain preferred embodiment of the present invention has been shown and described in detail, it should be understood that various changes and modifications may be made to the embodiment without departing from the scope of the invention as set forth in the appended claims.

What is claimed is:

1. A teaching line correcting apparatus for correcting a teaching line, which is identified by a first reference region and a second reference region, and which is indicative of movement of a robot, comprising:
- a position setting unit for setting a first reference position, a second reference position, and a third reference position where a first reference region, a second reference region, and a third reference region are established on a workpiece;
- a first plane defining unit for defining a first plane, which includes a line passing through the first reference position that is located at a starting operation point of the robot or within a given range from the starting operation point, and the second reference position, which is located at an ending operation point of the robot or within a given range from the ending operation point, and which is determined by the third reference position;
- at least one position detector for detecting positions of the first reference region, the second reference region, and the third reference region established on the workpiece;
- a second plane defining unit for defining a second plane, which includes a line passing through the detected position of the first reference region and the detected position of the second reference region, and which is determined by the detected position of the third reference region;
- a corrective value calculator for calculating a corrective value for equalizing the first reference region to an origin, equalizing the first reference position of the first reference region as the origin to the detected position of the first reference region as the origin, and equalizing the first plane to the second plane; and
- a teaching line corrector for correcting the teaching line based on the calculated corrective value,
- wherein if the position detector fails to detect any one of the first reference region, the second reference region, or the third reference region, the second plane defining unit defines, as the second plane, a plane that includes a line passing through a position closest to the first reference region and a position closest to the second reference region, out of the detected positions of the remaining two reference regions, and which is determined by an undetected position of the reference region that has been set by the position setting unit; and
- the corrective value calculator calculates a corrective value for equalizing the reference region closest to the first reference region to the origin, equalizing the reference position of the reference region as the origin to the detected position of the reference region as the origin, and equalizing the first plane to the second plane.

2. A teaching line correcting apparatus according to claim 1, wherein the workpiece comprises an automobile body made up of a plurality of panels; and
the position setting unit sets two of the first reference position, the second reference position, and the third reference position on one of the panels.

3. A teaching line correcting apparatus according to claim 1, wherein the second reference position set by the position setting unit is located at an end of the workpiece.

4. A teaching line correcting apparatus according to claim 1, wherein at least one of the position detector, the corrective value calculator, and the teaching line corrector is included in the robot.

5. A teaching line correcting apparatus according to claim 1, wherein the position detector comprises a photoelectric transducer.

6. A teaching line correcting method for correcting a teaching line, which is identified by a first reference region and a second reference region, and which is indicative of movement of a robot, comprising the steps of:
- presetting a first reference position, a second reference position, and a third reference position where a first reference region, a second reference region, and a third reference region are established on a workpiece;
- defining a first plane, which includes a line passing through the first reference position that is located at a starting operation point of the robot or within a given range from the starting operation point and the second reference position that is located at an ending operation point of the robot or within a given range from the ending operation point, and which is determined by the third reference position;
- detecting positions of the first reference region, the second reference region, and the third reference region established on the workpiece;
- defining a second plane, which includes a line passing through the detected position of the first reference region and the detected position of the second reference region, and which is determined by the detected position of the third reference region;
- calculating, via a processor, a corrective value for equalizing the first reference region to an origin, equalizing the first reference position of the first reference region as the origin to the detected position of the first reference region as the origin, and equalizing the first plane to the second plane; and
- correcting the teaching line based on the calculated corrective value,
- wherein if the position detector fails to detect any one of the first reference region, the second reference region, or the third reference region, the second plane defining unit defines, as the second plane, a plane that includes a line passing through a position closest to the first reference region and a position closest to the second reference region, out of the detected positions of the remaining two reference regions, and which is determined by an undetected position of the reference region that has been set by the position setting unit; and
- the corrective value calculator calculates a corrective value for equalizing the reference region closest to the first reference region to the origin, equalizing the reference position of the reference region as the origin to the detected position of the reference region as the origin, and equalizing the first plane to the second plane.

7. A non-transitory computer-readable medium for enabling a computer to function as a teaching line correcting apparatus for correcting a teaching line, which is identified by a first reference region and a second reference region, and which is indicative of movement of a robot, the computer-readable medium further enabling the computer to function as:
- a position setting unit for presetting a first reference position, a second reference position, and a third reference position where a first reference region, a second reference region, and a third reference region are established on a workpiece;
- a first plane defining unit for defining a first plane, which includes a line passing through the first reference position that is located at a starting operation point of the robot or within a given range from the starting operation point and the second reference position that is located at an ending operation point of the robot or within a given range from the ending operation point, and which is determined by the third reference position;
- at least one position detector for detecting positions of the first reference region, the second reference region, and the third reference region established on the workpiece;

a second plane defining unit for defining a second plane, which includes a line passing through the detected position of the first reference region and the detected position of the second reference region, and which is determined by the detected position of the third reference region;

a corrective value calculator for calculating a corrective value for equalizing the first reference region to an origin, equalizing the first reference position of the first reference region as the origin to the detected position of the first reference region as the origin, and equalizing the first plane to the second plane; and a teaching line corrector for correcting the teaching line based on the calculated corrective value, wherein if the position detector fails to detect any one of the first reference region, the second reference region, or the third reference region, the second plane defining unit defines, as the second plane, a plane that includes a line passing through a position closest to the first reference region and a position closest to the second reference region, out of the detected positions of the remaining two reference regions, and which is determined by an undetected position of the reference region that has been set by the position setting unit; and the corrective value calculator calculates a corrective value for equalizing the reference region closest to the first reference region to the origin, equalizing the reference position of the reference region as the origin to the detected position of the reference region as the origin, and equalizing the first plane to the second plane.

8. A teaching line correcting apparatus for correcting a teaching line, which is identified by a first reference region and a second reference region, and which is indicative of movement of a robot, comprising:

a position setting unit for setting a first reference position, a second reference position, and a third reference position where a first reference region, a second reference region, and a third reference region are established on a workpiece;

a first plane defining unit for defining a first plane, which includes a line passing through the first reference position that is located at a starting operation point of the robot or within a given range from the starting operation point, and the second reference position, which is located at an ending operation point of the robot or within a given range from the ending operation point, and which is determined by the third reference position;

at least one position detector for detecting positions of the first reference region, the second reference region, and the third reference region established on the workpiece;

a second plane defining unit for defining a second plane, which includes a line passing through the detected position of the first reference region and the detected position of the second reference region, and which is determined by the detected position of the third reference region;

a corrective value calculator for calculating a corrective value for equalizing the first reference region to an origin, equalizing the first reference position of the first reference region as the origin to the detected position of the first reference region as the origin, and equalizing the first plane to the second plane; and a teaching line corrector for correcting the teaching line based on the calculated corrective value, wherein the workpiece comprises an automobile body made up of a plurality of panels; and the position setting unit sets two of the first reference position, the second reference position, and the third reference position on one of the panels, and remaining one of the first reference position, the second reference position and the third reference position on another one of the panels.

9. A teaching line correcting method for correcting a teaching line, which is identified by a first reference region and a second reference region, and which is indicative of movement of a robot, comprising the steps of:

presetting a first reference position, a second reference position, and a third reference position where a first reference region, a second reference region, and a third reference region are established on a workpiece;

defining a first plane, which includes a line passing through the first reference position that is located at a starting operation point of the robot or within a given range from the starting operation point and the second reference position that is located at an ending operation point of the robot or within a given range from the ending operation point, and which is determined by the third reference position;

detecting positions of the first reference region, the second reference region, and the third reference region established on the workpiece;

defining a second plane, which includes a line passing through the detected position of the first reference region and the detected position of the second reference region, and which is determined by the detected position of the third reference region;

calculating, via a processor, a corrective value for equalizing the first reference region to an origin, equalizing the first reference position of the first reference region as the origin to the detected position of the first reference region as the origin, and equalizing the first plane to the second plane, wherein the workpiece comprises an automobile body made up of a plurality of panels; and the position setting unit sets two of the first reference position, the second reference position, and the third reference position on one of the panels, and remaining one of the first reference position, the second reference position and the third reference position on another one of the panels.

10. A non-transitory computer-readable medium for enabling a computer to function as a teaching line correcting apparatus for correcting a teaching line, which is identified by a first reference region and a second reference region, and which is indicative of movement of a robot, the computer-readable medium further enabling the computer to function as:

a position setting unit for presetting a first reference position, a second reference position, and a third reference position where a first reference region, a second reference region, and a third reference region are established on a workpiece;

a first plane defining unit for defining a first plane, which includes a line passing through the first reference position that is located at a starting operation point of the robot or within a given range from the starting operation point and the second reference position that is located at an ending operation point of the robot or within a given range from the ending operation point, and which is determined by the third reference position;

at least one position detector for detecting positions of the first reference region, the second reference region, and the third reference region established on the workpiece;

a second plane defining unit for defining a second plane, which includes a line passing through the detected position of the first reference region and the detected position of the second reference region, and which is determined by the detected position of the third reference region;

a corrective value calculator for calculating a corrective value for equalizing the first reference region to an origin, equalizing the first reference position of the first reference region as the origin to the detected position of the first reference region as the origin, and equalizing the first plane to the second plane; and a teaching line corrector for correcting the teaching line based on the calculated corrective value, wherein the workpiece comprises an automobile body made up of a plurality of panels; and the position setting unit sets two of the first reference position, the second reference position, and the third reference position on one of the panels, and remaining one of the first reference position, the second reference position and the third reference position on another one of the panels.

\* \* \* \* \*